3,311,689
PREPARATION OF INORGANIC OXIDE
MONOFILAMENTS
Robert H. Kelsey, Chagrin Falls, Ohio, assignor to Horizons Incorporated, Cleveland, Ohio, a corporation of New Jersey
Filed Jan. 17, 1963, Ser. No. 252,083
8 Claims. (Cl. 264—210)

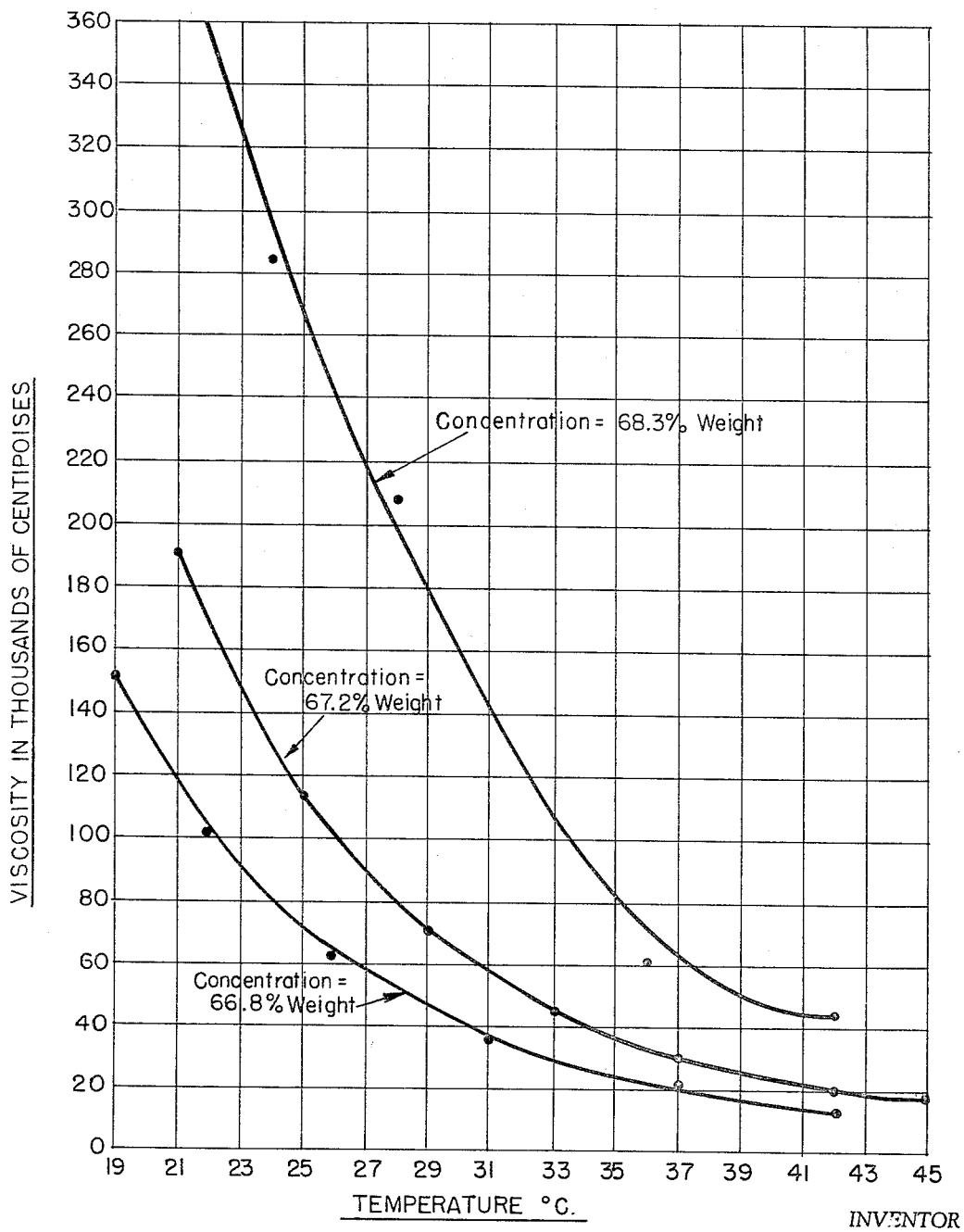

This invention relates to inorganic oxides in monofilament form and to the preparation of liquid compositions from which monofilaments of inorganic oxides may be spun. More particularly, it relates to improvements in the manner in which the process is carried out, to the end that more uniform product and more uniform processing may be attained.

A United States patent application, Ser. No. 72,277 filed November 29, 1960 and issued April 27, 1965, as United States Patent 3,180,741 describes the preparation of novel inorganic polymers in liquid form, and preparation of solid microcrystalline products obtained from said liquid polymers.

The present invention is directed to improvements in the processes described in said patent, and specifically to the improvement in the extrusion process which is a consequence of altering the composition of the material being extruded, by the addition of suitable wetting agents to the extruded composition and is also a consequence of controlling the temperature of the material being extruded so that the rate of change of viscosity of the material being extruded is well below the rate of change of viscosity characteristic of the material for unit changes in temperature, at other temperatures than those at which the process is performed.

Briefly the process of this invention comprises the following sequence of steps:

(1) Preparation of a stable solution or small particle sol based on an aluminum salt of a mixture of organic acids;

(2) Treatment of the above composition to yield a viscous polymeric material from which monofilament can be successfully spun;

(3) Adjustment of the temperature of the viscous material to a temperature at which the rate of change of its viscosity per unit of temperature approaches a minimal value;

(4) Extrusion of the viscous polymeric material through a spinnerette, while it is maintained at the required temperature, into a fluid of suitable composition;

(5) Stretching or drawing of the freshly spun filament immediately after it emerges from the orifices in the spinnerette plate; and (6) Final consolidation of the filament by firing the same under conditions such that the organic matter present in the "green" fiber is removed and the filament or fiber develops the desired microcrystalline refractory oxide physical and chemical structure.

Each of the above steps will now be defined in greater detail, with specific reference to alumina as a preferred inorganic oxide illustrative of the practice of this invention, but it is to be understood that the invention is applicable to other inorganic oxides such as those to which reference is made in the above noted United States Patent 3,180,741, namely the oxides of aluminum, titanium, vanadium, chromium, manganese, iron, cobalt, nickel, yttrium, zirconium, the lanthanide rare earths, hafnium and thorium, and particularly to zirconia as another preferred oxide.

*Preparation of stable solution or small particle sol*

The viscous liquid from which the desired inorganic oxide fibers are ultimately obtained is based on suitable salts of organic acids. For the preparation of alpha alumina a dilute solution is prepared in which the aluminum is provided as a salt of an aliphatic mono-or polycarboxylic acid having a dissocation constant of at least $1.5 \times 10^{-5}$. A mixture of such salts may be used provided the aluminum salts are either completely water soluble or are rendered soluble by the presence of sufficient acid, and the same provision applies to the use of only one aluminum salt. In the present process, the preferred aluminum salt is a salt of acetic and formic acids called aluminum formoacetate and having the chemical formula $Al(CHO_2)(OH)(C_2H_3O_2)$.

At the concentrations required in the liquid to be extruded aluminum formoacetate is not completely soluble in water, but forms an unstable turbid suspension which on standing becomes progressively whiter and eventually settles out as a solid. Furthermore when heater, e.g. for the purpose of concentrating the solution it was found that particle growth and settling were accelerated. Consequently it will be seen that solutions of aluminum formoacetate do not inherently possess the desired stability for the process, at the concentrations at which they are to be utilized.

A stabilized dilute sol of aluminum formoacetate is obtained by adding a suitable amount of tartaric acid to the dilute solution of aluminum formoacetate. The effect is not merely the effect of additional acid since it is not achieved by the addition of a mineral acid such as HCl instead of tartaric acid. The effect of variations in the amount of tartaric acid on the properties of aluminum formoacetate solutions is indicated in the following table (all solutions being in 100 g. of water), from which it appears that between 8 and 15 grams of tartaric acid per 100 grams of aluminum formoacetate produce the desired result.

TABLE I

| Aluminum Formoacetate (g.) | Tartaric Acid (g.) | pH | Viscosity (centipoises) | Appearance |
|---|---|---|---|---|
| 125 | 2 | 4.1 | 336 | Turbid. |
| 125 | 5 | 4.0 | 202 | Do. |
| 125 | 10 | 3.9 | 152 | Sl. Turbid. |
| 144 | 19 | 3.7 | 3,200 | Turbid. |
| 125 | 19 | 3.7 | 132 | Clear. |
| 130 | 25 | 3.4 | 77 | Do. |
| 140 | 25 | 3.5 | 145 | V. sl. turbid. |
| 150 | 25 | 3.6 | 237 | Sl. turbid. |
| 160 | 25 | 3.6 | 368 | Turbid. |

Even when stabilized by the addition of tartaric acid or other suitable polycarboxylic acid, the compositions described above do not yield filaments in a completely satisfactory manner when extruded because they are too dilute. Furthermore it is frequently found that the material being extruded accumulates around the orifices of the spinnerette, possibly due to the forces induced in the filament as the emerging strand is pulled over the edges of the spinnerette orifice. This condition was ameliorated by adding a neutral or anionic ester of a sulfonated fatty acid to the spinning solution, whereby the surface tension of the emerging composition was diminished and an orderly development of the monofilament or fiber was achieved. One unexpected result which was noted in connection with the addition of a wetting agent was that the rate of solution of the aluminum formoacetate and the clarity of the spinning solution were noticeably improved.

Other surface active agents of a similar nature may be used in place of the preferred fatty acid esters.

One preferred stabilized dilute solution from which a spinning solution may be obtained by suitable processing possessed the following composition:

| | Wt. Percent |
|---|---|
| Aluminum formoacetate | 55.4 |
| Tartaric acid | 9.2 |
| Aerosol OT (1:50 in water) (sodium sulfosuccinate) | 0.9 |
| Water | 34.5 |

The pH of this solution is normally in the range 3.4–3.6, and no adjustment of pH has been found necessary.

Both neutral and anionic wetting agents have been found to be equally effective.

In the above formulation, the 0.002 percent by weight of sodium sulfosuccinate (Aerosol OT) used provides a small excess in the solution. It has been found that greater amounts inhibit fibering by reducing the surface tension too much, while smaller amounts do not provide the desired stabilization, nor are smaller amounts sufficient to prevent accumulation of solution at the spinnerette.

As stabilizers for the aluminum formoacetate, any of a number of carboxylic acids could be used in place of the tartaric acid, and mixtures of such acids may also be used. The amount of acid utilized does not appear to be critical, but less than the stated amount slows the dissolution of the aluminum formoacetate and larger amounts produced no additional benefits in the specific formulation illustrated above.

The above exemplary composition is prepared by adding several ingredients to water in an open container, and mixing until the solids are completely dispersed. Preferably the temperature at which mixing is accomplished is between 60° C. and 70° C.

The above liquid composition is then filtered through a coarse glass-cloth filter to remove any solid foreign matter and undispersed particles. This takes 15–30 minutes. At this point, the solution is full of small bubbles and appears somewhat white. Its room temperature viscosity is about 10,000 centipoises, but is difficult to measure because of the bubbles. It is still much too dilute to permit development of the desired viscosities.

(2) Preparation of viscous liquid for extrusion

The filtrate is next de-aired in a vacuum chamber. The filtered solution is poured into a container at least 5 times its volume, and the container is set on a small hot plate. A stirrer with a long impeller shaft is mounted above the container. A bell jar is placed over the assembly and a vacuum of at least 29 inches of mercury, (gauge) is applied. The hot plate is energized to maintain a solution temperature of 50–55° C. At first, while the solution viscosity is low, air and other dissolved gases are removed. As the process continues, water is removed, and the viscosity of the liquid increases. The process is continued until enough water is lost to bring the viscosity to about 135,000 centipoises at 24° C.

As a result of the foregoing treatment a viscous liquid suitable for extrusion is obtained. However the capability of the material to perform in the desired fashion was found to vary from day to day to such an extent that a solution which gave excellent monofilament on one day was wholly ineffective on the next day. It was found that this was largely due to variations in the temperature. The relationship between temperature and viscosity is shown in accompanying drawing, for the spinning solution described above, which is identified on the drawing as the 67.2 weight percent composition. In addition, the viscosity temperature relationship for a less concentrated (66.8% weight percent) and a more concentrated (68.3 weight percent) composition are plotted on the drawing, the former representing a lower viscosity composition and the latter a higher viscosity composition which were successfully processed. From the drawing, it will be seen that at some specific temperature in the vicinity of room temperature (e.g. 20° C.) each composition possesses a viscosity which is extremely sensitive to changes in temperature and this may explain why many early attempts to extrude the specified composition at prevailing room temperatures were only partly successful. It will be noted also that as the temperature is increased the change in viscosity for a one degree increase in temperature gradually diminishes.

The viscosity-temperature relations constitute a family of curves, representing various concentrations of the solid matter. By selecting the appropriate temperature, suitable spinning viscosity may be obtained from any of a range of concentrations, of which the three examples given above are illustrative.

It was found that the viscous liquid behaved in a reversible fashion and that when alternately heated and cooled between 42° C. and 19° C. the viscosity maintained the values shown on the graph.

(3) Extrusion

At spinnerette pressures from 200 p.s.i. to 500 p.s.i., continuous extrusion of ten monofilaments, all the same size, from a single spinnerette is readily accomplished.

Satisfactory control of the extrusion process has been achieved by the use of a constant temperature bath, thermostatically controlled to ±0.25° C. at a suitable temperature. From this bath, water is pumped through a jacket surrounding the spinnerette holder and associated plumbing. With the "standard" aluminum formoacetate composition described above, it has been found desirable to maintain the temperature of the material to be extruded at 30 to 31° C., whereby the material to be extruded has a viscosity which permits acceptable spinning rates. In addition, the heating to slightly above room temperature promotes rapid loss of volatile materials from the emerging monofilament when it is extruded into air of relatively low humidity. As shown in the drawings, changes in the composition merely shift the temperature-viscosity curve but do not alter its basic character. Consequently it appears that the optimum results are obtained by maintaining a constant temperature at the extrusion orifice such that the rate of change of viscosity per degree change in temperature is low enough to permit adequate control but still below a temperature at which the material being extruded experiences an irreversible change in composition. For the alumina concentrate this temperature limit appears to be about 45° C.

(4) Drawing

The monofilament, extruded from a 0.005 inch (127 micron) diameter orifice, is too large in diameter for most purposes. It is therefore stretched or drawn by mechanical means to a green diameter less than 25 microns. Because of a nominal 30% loss in volume resulting from the loss of volatile matter the filament must be extended to about 17.5 times its initial length to achieve a reduction of diameter from 127 microns to about 25 microns or less. This extension has not been found to offer any difficulty; monofilament is easily pulled from the spinnerette by a turning drum at rates as high as 60 times its emergent velocity.

(5) Final consolidation

A desired combination of transparency, toughness and flexibility is imparted to the "green" thread produced by the extrusion and drawing described above by heating the filament to temperatures sufficient first to eliminate the organic acid constituents from the composition, e.g., by heating the filaments to up to about 650° C., and then firing the fiber at temperatures between about 650° C. and 800° C. and even higher.

The above described process is applicable to the production of monofilaments of alumina, zirconia and other inorganic oxides of elements other than the alkali metal and alkaline earth metal oxides, and has also been practiced with mixtures to yield monofilaments of mixed oxides.

Having described preferred embodiments of this invention in accordance with patent statutes it is not intended that the invention be limited except as required by the appended claims.

I claim:

1. A process for producing solid, transparent, flexible filaments of at least one metal oxide of a metal selected from the group consisting of aluminum, titanium, vanadium, chromium, manganese, iron, cobalt, nickel, yttrium, zirconium, the lanthanide rare earths and hafnium which comprises:

(a) preparing a single phase liquid concentrate by first dissolving a water-soluble aliphatic carboxylate salt of said metal in water;
   (b) stabilizing said dilute solution by adding free carboxylic acid to said dilute solution, and adding about 0.002% by weight of a wetting agent to said solution;
   (c) thereafter filtering said solution thereby removing extraneous gases and undissolved solids from the resulting liquid;
   (d) and then removing water and other volatile constituents from the resultant clarified liquid by heating the same while at less than atmospheric pressure the combination of temperatures and pressures being such that water and other volatile constitutents in said clarified liquid are removed therefrom;
   (e) and, after the liquid has been concentrated sufficiently to be readily extrudable into filaments, maintaining the liquid concentrate at a temperature such that changes in its viscosity with changes in temperature are relatively small as compared with changes in viscosity with temperature at slightly lower temperatures, and extruding said concentrate, while it is maintained at said temperature, and recovering the resulting filaments.

2. The process of claim 1 wherein the metal is aluminum and the filaments are alumina.

3. The process of claim 2 wherein the salt first dissolved in water is aluminum formoacetate.

4. The process of claim 2 wherein the added free carboxylic acid has a dissociation constant less than $1 \times 10^{-5}$ for the first hydrogen.

5. The process of claim 2 wherein the temperature of extrusion is between about 19° C. and 45° C.

6. The process of claim 4 wherein the free carboxylic acid is tartaric acid.

7. The process of claim 2 wherein the extrusion temperature is between about 29° C. and a temperature at which the composition experiences an irreversible change when heated further.

8. The process of claim 1 including the following additional steps:

(f) stretching the freshly extruded filament immediately after it emerges from a spinnerette and
   (g) firing the stretched filament to burn away the organic matter present therein.

References Cited by the Examiner

UNITED STATES PATENTS 3,180,741   4/1965   Wainer et al. _____ 23—140 X

OSCAR R. VERTIZ, *Primary Examiner.*

MILTON WEISSMAN, *Examiner.*

H. T. CARTER, *Assistant Examiner.*